US007537821B2

(12) United States Patent
Kashima et al.

(10) Patent No.: US 7,537,821 B2
(45) Date of Patent: May 26, 2009

(54) WINDER LINER FOR AN UNVULCANIZED RUBBER MATERIAL

(75) Inventors: Shinji Kashima, Hiratsuka (JP); Takeshi Moriyama, Inazawa (JP); Goichi Hatakeyama, Inazawa (JP)

(73) Assignees: The Yokohama Rubber Co., Ltd., Tokyo (JP); Nippon Light Metal Co., Ltd., Tokyo (JP)

( * ) Notice: Subject to any disclaimer, the term of this patent is extended or adjusted under 35 U.S.C. 154(b) by 385 days.

(21) Appl. No.: 10/581,168

(22) PCT Filed: Dec. 2, 2004

(86) PCT No.: PCT/JP2004/017922

§ 371 (c)(1), (2), (4) Date: May 31, 2006

(87) PCT Pub. No.: WO2005/053941

PCT Pub. Date: Jun. 16, 2005

(65) Prior Publication Data

US 2007/0099021 A1 May 3, 2007

(30) Foreign Application Priority Data

Dec. 3, 2003 (JP) ............................. 2003-404783

(51) Int. Cl.
*B32B 1/00* (2006.01)
*B60C 9/00* (2006.01)
*B29D 30/08* (2006.01)
*B65H 18/08* (2006.01)

(52) U.S. Cl. ....................... 428/174; 428/156; 156/395; 156/405.1; 242/536

(58) Field of Classification Search ................. 428/174, 428/156, 157; 242/536; 156/395, 405.1
See application file for complete search history.

(56) References Cited

FOREIGN PATENT DOCUMENTS

| | | | |
|---|---|---|---|
| JP | 05-301300 | | 11/1993 |
| JP | 2000-053282 | | 2/2000 |
| JP | 2001-162693 | | 6/2001 |
| JP | 2001162693 A | * | 6/2001 |
| JP | 2004-034671 | | 2/2004 |

* cited by examiner

*Primary Examiner*—Jennifer McNeil
*Assistant Examiner*—Catherine Simone
(74) *Attorney, Agent, or Firm*—Greer, Burns & Crain, Ltd.

(57) ABSTRACT

A winding liner for an unvulcanized rubber material includes a belt-shape inextensible loading member for loading an unvulcanized rubber material and spacers provided at both widthwise direction sides of one surface of the loading member along a lengthwise direction of the loading member. The loading member and the spacers are made of metal and are formed into a plate shape having flexibility. The spacers have protruding portions protruding from the one surface of the loading member, the protruding portions being disposed at predetermined intervals in the lengthwise direction of the loading member.

8 Claims, 5 Drawing Sheets

21 10 12 14 11a 13 U1 U2 12 U3 14 13 U2 11 W

WINDER LINER FOR AN UNVULCANIZED RUBBER MATERIAL

TECHNICAL FIELD

The present invention relates to a winding liner for an unvulcanized rubber material, and more particularly, to a winding liner for an unvulcanized rubber material which is capable of winding and storing an unvulcanized rubber material such as a tread rubber or a side rubber for a tire without deformation.

TECHNICAL BACKGROUND

In conventional processes for manufacturing a tire, for example, after an unvulcanized rubber material W such as a tread rubber or a side rubber extruded in a given shape from an extruder 1 is cut at fixed intervals with a cutting machine 2, as shown in FIG. 10, there is a storing process of the cut unvulcanized rubber materials until they are used. In this storing process, the cut unvulcanized rubber materials Wa are loaded on a bogie 3 in multiple-stage with partition plates 4 and spacers 5 for storing them with the shapes thereof kept unchanged.

However, the unvulcanized rubber materials Wa which have been cut at fixed intervals will shrink down before they are used for the formation of an unvulcanized tire. Therefore, the accuracy of dimension is lowered at the time of forming unvulcanized tires, and deterioration occurs in uniformity of vulcanized tires.

Meanwhile, as shown in FIG. 11, there is known a method for winding and storing an unvulcanized rubber material Wa extruded in a given shape from a extruder 1 around a winding liner R in roll form without cutting it at fixed intervals (see Unexamined Japanese Patent Application Publication No. 05-301300, for example). The unvulcanized rubber material Wa which has been winded in roll form is unwinded to cut at fixed intervals immediately before use, thereby ensuring a good accuracy of dimension.

However, because of winding and storing the unvulcanized rubber material in roll form, sagging occurs due to the self-weight of the winding liner and the self-weight of the unvulcanized rubber material. For this reason, there is a problem where the shape of an unvulcanized rubber material W which has been formed in a given shape is deformed.

Therefore, as a measure to this problem, there has been proposed a winding liner for an unvulcanized rubber material including a belt-shaped inextensible loading member for loading an unvulcanized rubber material, and spacers which are respectively provided at both widthwise direction sides of one surface of the loading member along the lengthwise direction of the loading member (see Unexamined Japanese Patent Application Publication No. 05-301300, for example). The loading member is made of an inextensible material such as acetal homopolymer, and the spacers are formed from a rubber material with a square cross-section, hence enabling to store an unvulcanized rubber material which has been winded without causing deformation in shape thereof.

However, since spacers, which are solid and made from rubber members, extend along the loading member at both widthwise direction sides of the surface of the loading member, when the winding liner is bent in roll form, a bending resistance becomes large. For this reason, there are problems in which spacer deformation in shape, spacer damage, or the like may occur when the winding liner is repeatedly used, having trouble with durability.

Furthermore, the winding liner increases in weight, and air in the space which is defined by the spacers and where the unvulcanized rubber material is stored, is not in good circulation, hence causing a problem where cooling efficiency is quite low when the unvulcanized rubber material is stored.

DISCLOSURE OF THE INVENTION

An object of the present invention is to provide a winding liner for an unvulcanized rubber material, which is capable of retaining the shape of an unvulcanized rubber material which has been winded, increasing durability thereof, decreasing its own weight, and increasing cooling efficiency at the time of storing.

In order to achieve the above object, a winding liner for an unvulcanized rubber material according to the present invention includes a belt-shaped inextensible loading member for loading an unvulcanized rubber material, and spacers provided at both widthwise direction sides of one surface of the loading member along a lengthwise direction of the loading member, wherein the loading member and the spacers are made of metal and are formed into a plate shape having flexibility, the spacers having protruding portions protruding from the one surface of the loading member, the protruding portions being disposed at predetermined intervals in the lengthwise direction of the loading member.

According to the present invention described above, since the loading member and spacers of the winding liner are formed from metal plates, it is possible to avoid deformation of the shape of the unvulcanized rubber material which has been winded in a space created by the spacers between the one surface of the loading member and the other surface thereof.

Since the loading member and the spacers are made from flexible metal plates, when the unvulcanized rubber material is winded, it can be winded while easily changing the shape of the winding liner in roll form. Accordingly, the winding liner becomes more durable in comparison to the prior art, and can have a long lifetime Since the spacers have such a configuration that the protruding portions are disposed at predetermined intervals, the volume of each spacer can be reduced by an amount in volume corresponding to the predetermined intervals. Accordingly, the weight of each spacer used can be reduced, enabling reduction of the winding liner in weight.

Air flows from gaps created between the protruding portions of each spacer into a space where the unvulcanized rubber material is stored, and cooling efficiency is, therefore, increased when a hot unvulcanized rubber material which has been just extruded from an extruder is winded and stored.

BEST MODES FOR CARRYING OUT THE INVENTION

Embodiments of the present invention will be described in detail below with reference to the drawings.

Figure 1:
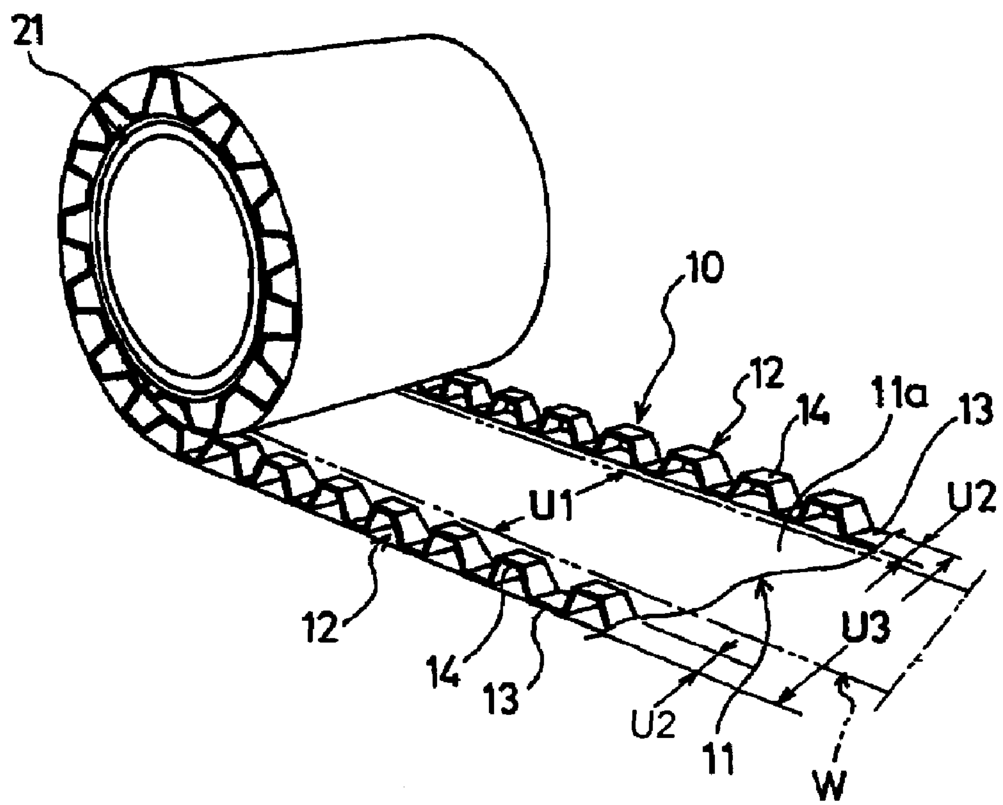
FIG. 1 is a partial perspective view of a winding liner for an unvulcanized rubber material according to the present invention, with part of the winding liner winded around a core member.
Figure 2:
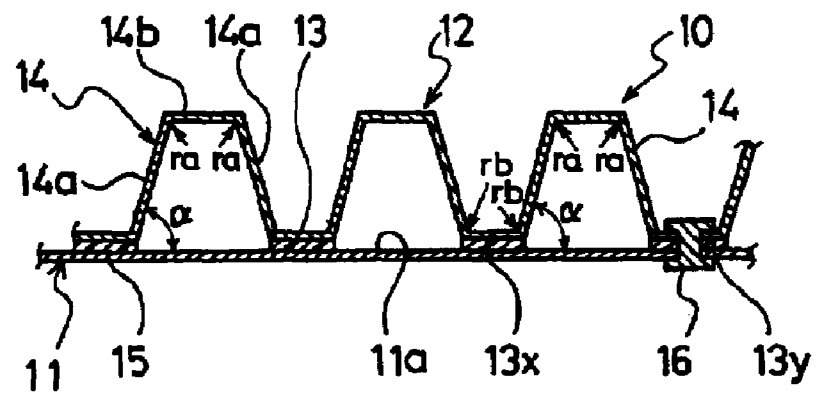
FIG. 2 is a partial enlarged cross-sectional view of the winding liner shown in FIG. 1, taken along the lengthwise direction thereof.
Figure 3:
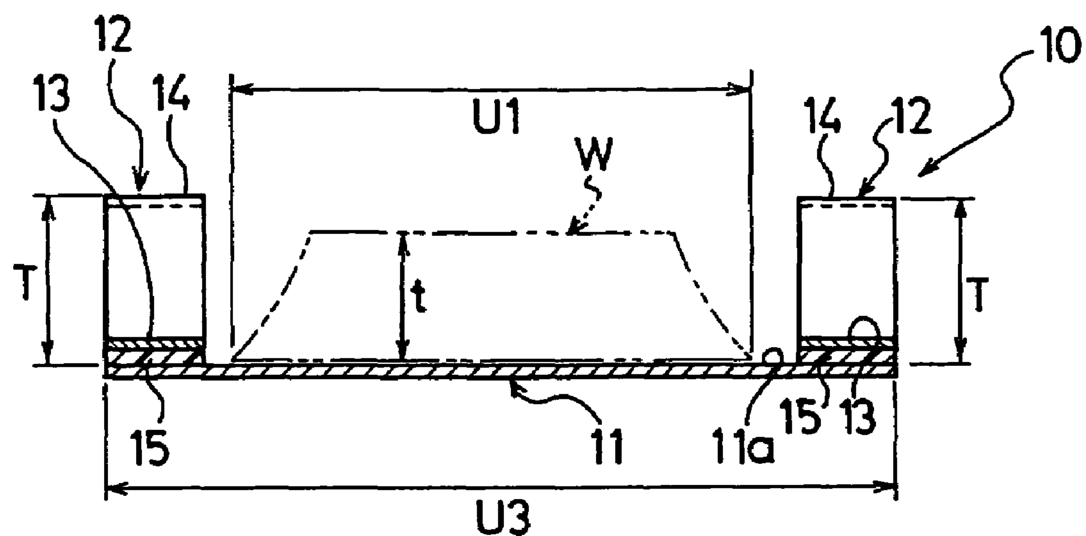
FIG. 3 is a partial enlarged cross-sectional view of the winding liner shown in FIG. 1, taken along the widthwise direction thereof.

In FIGS. 1 to 3, reference numeral 10 denotes a winding liner for an unvulcanized rubber material of the present invention. This winding liner 10 includes a belt-shaped loading member 11 for loading an unvulcanized rubber material W which has been extruded in a given shape from an extruder (not shown), and spacers 12 which are respectively provided at both widthwise direction sides of one surface 11*a* of the loading member 11.

The loading member 11 is formed from a belt-shaped metal plate which is inextensible and flexible enough to follow the winding of the winding liner 10 in roll form. In order to wind and store the unvulcanized rubber material W, the loading member 11 has a width U3 which is not less than the total of the width U1 of the unvulcanized rubber material W and the widths U2 of the spacers 12 provided on both sides of the loading member 11.

Any kind of metal can be used to form the loading member 11, with no particular limitation, as long as one has certain flexibility when formed into a metal plate. Steel, stainless steel, aluminum alloy, and the like are enumerated, as examples. It is preferable, from a viewpoint of reduction in weight and machinability, to use aluminum alloy (for example, A3000 series, A5000 series, A6000 series, and the like standardized in JIS (Japanese Industrial Standards), and AA3000 series, AA5000 series, AA6000 series, and the like standardized in AA (American Aluminum Association)). When an aluminum alloy (A5052P) is used for the loading member 11, the thickness of the loading member 11 may be in the range of 0.6 mm to 1.0 mm, for example. Both surfaces of the loading member 11 made of aluminum alloy are preferably subjected to alumite treatment. Further, both surfaces of the loading member 11 are preferably subjected to matte finish so as to maintain a good separation condition for the unvulcanized rubber material W over the loading member 11.

The spacers 12 extend in parallel to each other along the lengthwise direction of the loading member 11. Each of the spacers 12 is also formed from a belt-shaped metal plate which is flexible enough to follow the winding of the winding liner 10 in roll form. Each of the spacers 12 comprises a plurality of base portions 13 which are fixed onto the one surface 11*a* of the loading member 11, and a plurality of protruding portions 14 protruding from the one surface 11*a* of the loading member 11, both of which are alternately disposed in the lengthwise direction of the loading member 11.

Any kind of metal can be used to form the spacers 12 as in the case of the loading member 11, with no particular limitation, as long as one has certain flexibility when formed into a metal plate. Steel, stainless steel, aluminum alloy, and the like are enumerated, as examples. It is preferable, from a viewpoint of reduction in weight and machinability, to use aluminum alloy (for example, A3000 series, A5000 series, A6000 series, and the like standardized in JIS, and AA3000 series, AA5000 series, AA6000 series, and the like standardized in AA Standards). When an aluminum alloy (A5052P) is used for the spacers 12, the thickness of each of the spacers 12 may be in the range of 0.5 mm to 0.8 mm, for example.

As shown in FIG. 2, each of the protruding portions 14 which are disposed at predetermined intervals in the lengthwise direction of the loading member 11 protrudes from the one surface 11*a* of the loading member 11 with a substantially trapezoidal cross-section, and has two inclined surfaces 14*a* and a top surface 14*b*. An inner region surrounded by the inclined surfaces 14*a* and the top surface 14*b* is hollow. Each of the protruding portions 14 is open at its both sides located in the widthwise direction of the spacer. The height T of each of the protruding portions 14 is greater in length than the thickness t of the unvulcanized rubber material W. The heights T, widths, and intervals of the protruding portions 14 are determined accordingly, depending on the size of the unvulcanized rubber material W to be stored.

It is desirable that in order to increase fatigue strength of the spacers 12 which will deflect when the unvulcanized rubber material W is winded, an inclined angle a of the inclined surface 14*a* of the cross-sectionally substantially trapezoidal protruding portion 14 be about 70° to about 85° with respect to the one surface 11*a* of the loading member 11, and a corner between each inclined surface 14*a* and a top surface 14*b* connected thereto and a corner between each inclined surface 14*a* and a base portion 13 connected thereto be formed in the form of circular arcs in cross-section having curvature radii ra and rb, respectively. The curvature radii ra and rb may be substantially 3 to 5 mm, for example. Preferably, the curvature radii rb of the corners between the inclined surfaces 14*a* and the base portions 13 connected thereto are set to be larger, whereby the fatigue strength of the spacers 12 is further increased.

Figure 4:
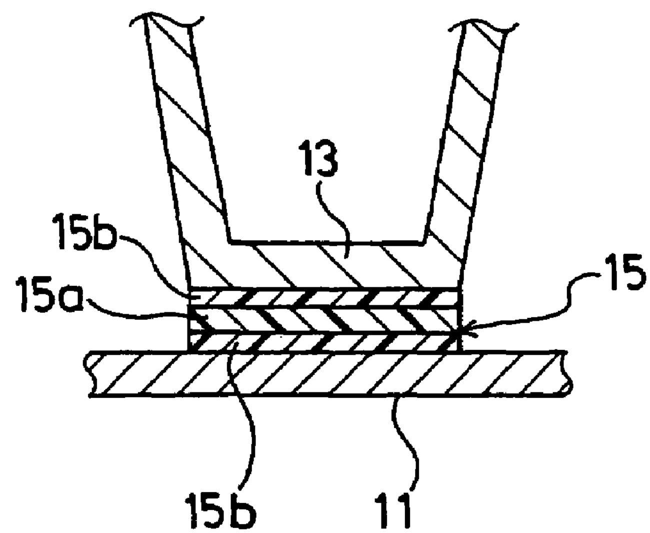
FIG. 4 is an enlarged cross-sectional view of an adhesive tape shown in FIG. 2

As shown in FIG. 4, each of the spacers 12 is fixed to the loading member 11 by adhering the base portions 13 onto the one surface 11*a* of the loading member 11 with adhering means comprising adhesive tapes 15 which have a base layer 15*a* and adhesive layers 15*b* on both sides thereof. It is preferable to use such adhesive tapes 15 to make it easy to manufacture the winding liner 10, but not limited thereto; an adhesion bond or the like may be used as the adhering means in place of the adhesive tapes 15.

Among all the fixed base portions 13 of each spacer, a plurality of base portions 13*y* spaced apart by a predetermined number (for example, 30) of base portions 13*x* are fixed to the one surface 11*a* of the loading member 11 with metal-made fixing means comprising rivets 16. Fixing by use of this metal-made fixing means is not always necessary, but it is preferable to fix the base portions 13*y* to the loading member 11 by use of the metal-made fixing means in order to securely prevent each of the spacers 12 from being laterally displaced with respect to the loading member 11 when the unvulcanized rubber material W is winded. For the metal-made fixing means, welding may be used in place of the rivets 16.

The above-described winding liner 10 can be manufactured as follows, for example.

Figure 5:
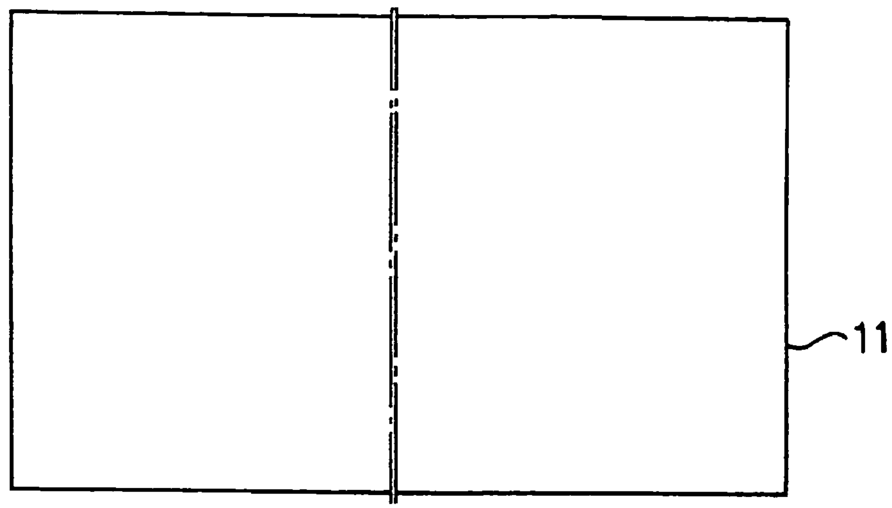
FIG. 5 is a plan view showing a loading member and spacers partly omitted, which are used in a manufacturing method of a winding liner for an unvulcanized rubber material of the present invention.
Figure 5:
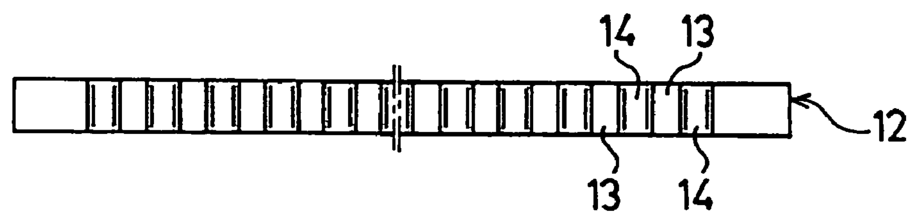
Figure 5:
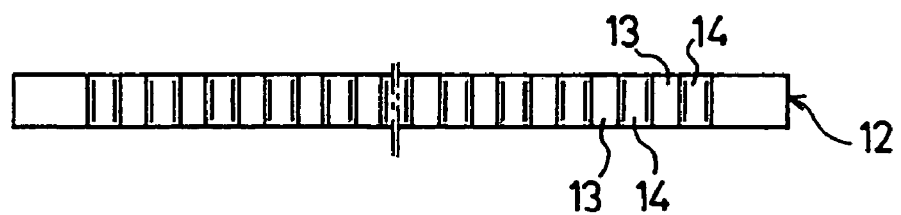
Figure 6:
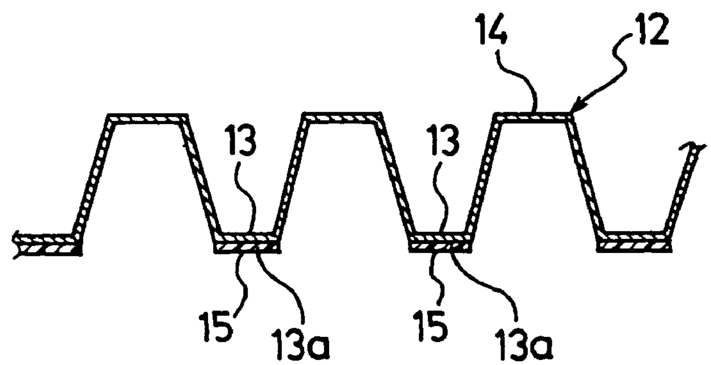
FIG. 6 is a partial enlarged cross-sectional view showing a state where adhesive tapes are stuck on a spacer.
Figure 7:
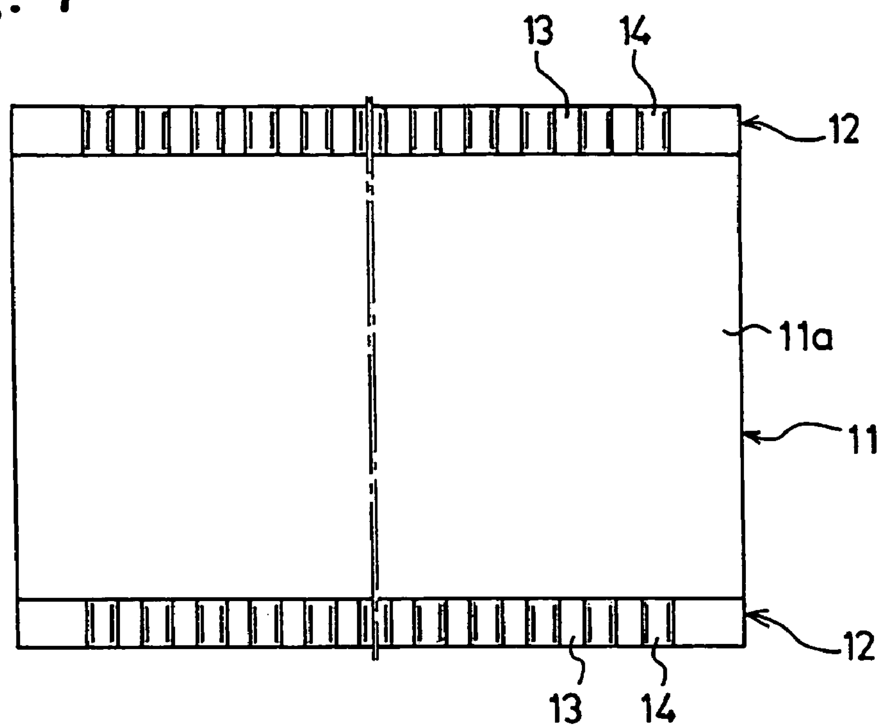
FIG. 7 is a plan view partly omitted, showing a state where the spacers on which the adhesive tapes are stuck are adhered to the loading member.

Firstly, as shown in FIG. 5, there are prepared the loading member 11, and two spacers 12 where the base portions 13 and the protrusion portions 14 are alternately provided. Next, as shown in FIG. 6, the adhesive tapes 15 are adhered to the back surfaces 13*a* of the base portions 13 of each spacer 12. Subsequently, as shown in FIG. 7, the base portions 13 of each spacer 12 to which the adhesive tapes 15 have been adhered are adhered along both sides of the one surface 11*a* of the loading member 11. Thus the spacers 12 are fixed on both sides of the loading member 11 in a widthwise direction thereof.

Among all the fixed base portions 13 of each spacer 12, the plurality of base portions 13*y* spaced apart by a predetermined number of base portions 13*x* are further fixed to the one surface 11*a* of the loading member 11 by the rivets 16, thereby obtaining the winding liner 10 shown in FIGS. 1 to 3.

Figure 8:
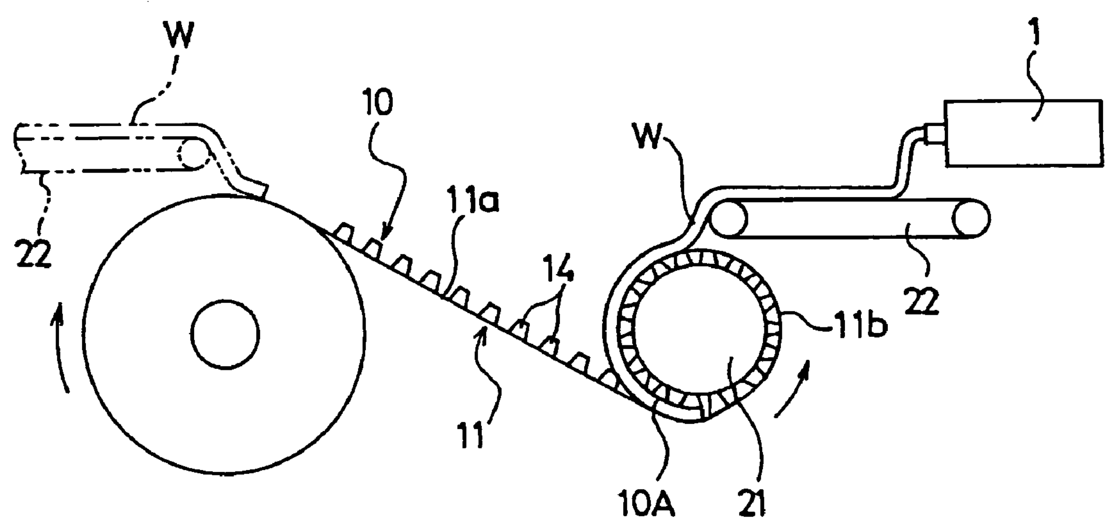
FIG. 8 is an explanatory view showing how the unvulcanized rubber material is winded with the winding liner of the present invention.

The unvulcanized rubber material W extruded in a given shape from an extruder 1 can be winded by use of the above-described winding liner 10, as shown in FIG. 8, for example.

That is, a winding start portion 10A of the winding liner 10 is winded around a core member 21 of a winding machine (not shown) at least one time with the other surface 11*b* of the loading member 11 being a radially outer surface, and then the unvulcanized rubber material W which has been extruded in a given shape from an extruder 1 is supplied to the winding machine via a conveyer 22. The unvulcanized rubber material W thus supplied is loaded on the other surface 11*b* of the loading member 11 which has been winded around the core member 21. The loaded unvulcanized rubber material W is winded with the winding liner 10 in such a manner that the unvulcanized rubber material W is housed between the one surface 11*a* of the loading member 11 and the other surface 11*b* thereof against which the protruding portions 14 of the spacers 12 abut.

In an example shown in FIG. 8, the unvulcanized rubber material W is winded by loading it on the other surface 11*b* of the loading member 11 of the winding liner 10. Alternatively, the unvulcanized rubber material W may be winded by loading it on the one surface 11*a* of the loading member 11, as shown by chain double-dashed lines in FIG. 8.

According to the above-described present invention, since the loading member 11 and spacers 12 of the winding liner 10 are formed from metal plates, the unvulcanized rubber material W which has been winded with the winding liner 10 can retain its own shape without deformation.

Since the loading member 11 and the spacers 12 are made from flexible metal plates, when the unvulcanized rubber material W is winded, it can be winded while the shape of the winding liner 10 is easily changed into a roll form. Accordingly, the winding liner 10 becomes more durable in comparison to the prior art, and can have a long lifetime.

Since the spacers 12 have such a configuration that the protruding portions 14 are disposed at predetermined intervals, the volume of each spacer 12 can be reduced by an amount in volume corresponding to the predetermined intervals. Accordingly, the weight of the winding liner 10 used can be reduced. Each of the protruding portions 14 has a hollow inside, enabling further reduction of the winding liner 10 in weight.

Because of the presence of hollows in the spacers 12, air in the space where the unvulcanized rubber material W is to be stored is circulated in a good condition, thereby increasing the cooling efficiency when the unvulcanized rubber material W is winded and stored in rolled form.

Figure 9:
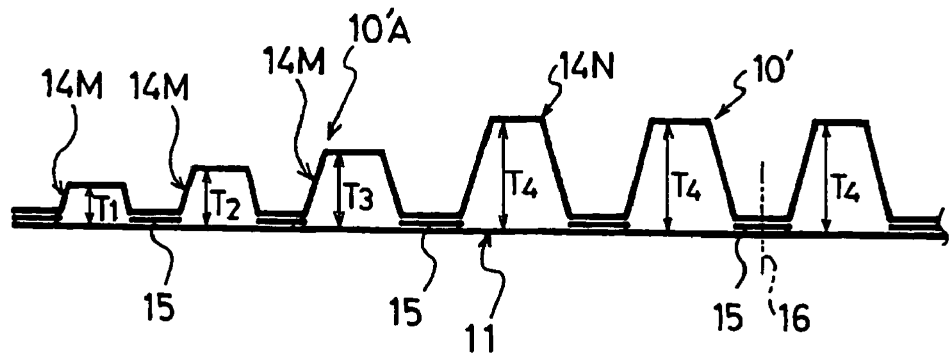
FIG. 9 is an explanatory view showing another embodiment of a winding liner for an unvulcanized rubber material according to the present invention.
Figure 10:
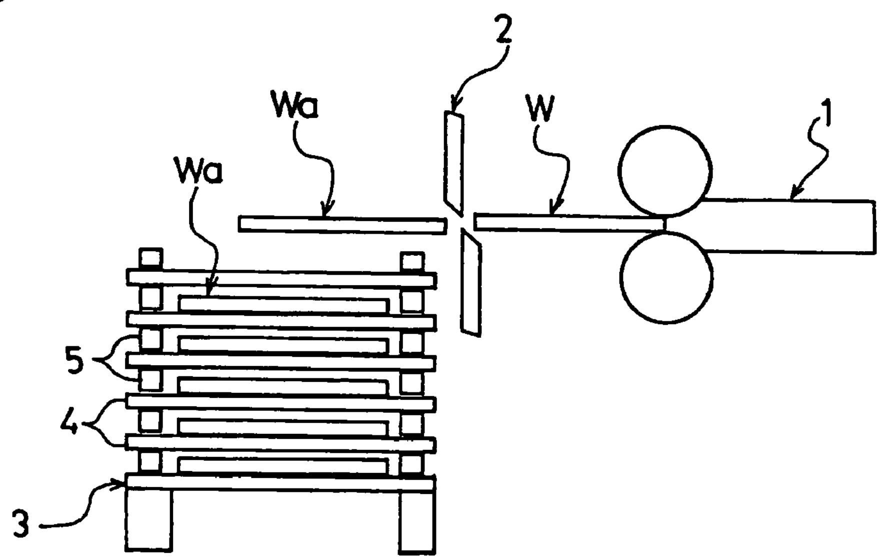
FIG. 10 is an explanatory view showing an example of a conventional way of storing an unvulcanized rubber material.
Figure 11:
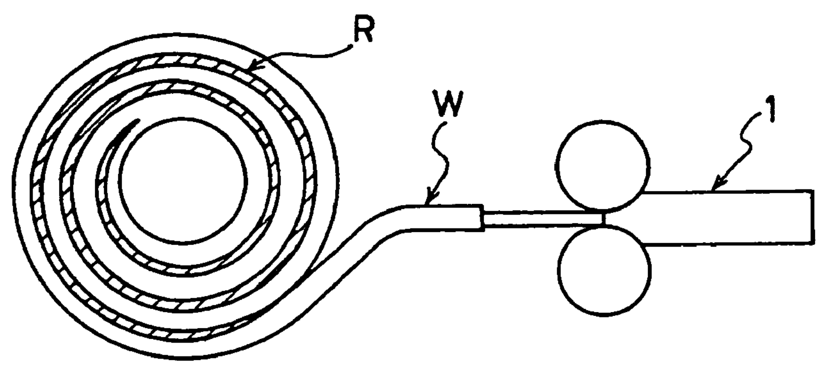
FIG. 11 is an explanatory view showing another example of a conventional way of storing an unvulcanized rubber material.

FIG. 9 shows another embodiment of a winding liner according to the present invention. The winding liner 10' includes spacers 12 having a plurality of protruding portions 14M with heights T1, T2 and T3 which are located in a winding start part 10'A of the winding liner 10', the heights T1, T2 and T3 being lower than the heights T4 of protruding portions 14N located in a region other than the winding start part 10'A. In the example illustrated, the heights T1, T2 and T3 of the protruding portions 14M are lower than the heights of the protruding portions 14N in such a manner that the heights T1, T2 and T3 become gradually higher from the winding start side of the winding liner 10' toward a winding end side thereof. Other constituent parts are the same as those of the winding liner 10 shown in FIGS. 1 to 3.

When a winding liner is winded by a winding machine (not shown), it is generally winded around the core member 21 as shown in FIG. 8. At that time, if the heights of the plurality of protruding portions 14M located in the winding start part 10'A of the winding liner 10' are the same as those of the protruding portions 14N located in the other region, a lateral displacement occurs in liner parts which have been winded up on the winding start part 10'A in layers, and a collapse of the winding liner 10' may happen.

Hence, as describe above, lowering the heights of the protruding portions 14M located in the wind start part 10'A of the winding liner 10' makes it possible to suppress occurrence of the lateral displacement of the winding liner 10' and to prevent collapsing of the winding liner 10' which has been winded. Although it is preferable to set the heights of the protrusion portions 14M to become gradually higher, they may be set at the same height being lower than the heights of the protruding portions 14N.

The number of the protruding portions 14M having lower heights is three in an example shown in the drawing, but not limited thereto; the number of the protruding portions 14M may be conveniently set depending on such conditions as the diameter of the core member 21 of the winding machine (not shown) and winding speed. The heights T1, T2 and T3 of the protruding portions 14M may also be set in a similar manner.

In the present invention, it is preferable to set the shape of each of the protruding portions 14 of the spacers 12 to be trapezoidal as described above. However, it is not limited to that shape, and may be semi-circular, for example.

In the above-described embodiment, the spacers 12 are fixed onto the loading members 11 with the adhering means; however, without use of the adhering means, each of the base portions 13 may be fixed to the one surface 11*a* of the loading member 11 with metal-made fixing means such as rivets.

The present invention is preferably employed particularly in the field where an unvulcanized rubber material W such as a tread rubber or a side rubber for a tire extruded in a given shape from an extruder is winded and stored; but of course, the application thereof is not limited to that field.

INDUSTRIAL APPLICABILITY

The present invention having the above-described superior effects is very effectively applicable to winding liners for an unvulcanized rubber material for winding and storing an unvulcanized rubber material to be used such as a tread rubber or a side rubber for a tire.

What is claimed is:

1. A winding liner for an unvulcanized rubber material, comprising:

a belt-shaped inextensible loading member for loading an unvulcanized rubber material; and spacers provided at both widthwise direction sides of one surface of the loading member along a lengthwise direction of the loading member, wherein the loading member and the spacers are made of metal and are formed into a plate shape having flexibility; and the spacers have protruding portions protruding from the one surface of the loading member, the protruding portions being disposed at predetermined intervals in the lengthwise direction of the loading member, wherein each of the spacers is formed from a flexible metal plate and has base portions fixed to the one surface of the loading member, the base portions and the protruding portions being alternately disposed in the lengthwise direction of the loading member, wherein the base portions of the spacers are fixed to the one surface of the loading member with adhering means, and wherein, among the fixed base portions of each spacer, a plurality of base portions spaced apart by a predetermined number of base portions are fixed with metal-made fixing means to the one surface of the loading member.

2. The winding liner for an unvulcanized rubber material according to claim 1, wherein the adhering means is an adhesive tape having adhesive layers on both sides thereof.

3. The winding liner for an unvulcanized rubber material according to claim 1, wherein each of the protruding portions has a hollow inside, and is open at its both sides located in a widthwise direction of the spacer.

4. The winding liner for an unvulcanized rubber material according to claim 3, wherein each of the protruding portions protrudes from the one surface of the loading member in a substantially trapezoidal shape.

5. The winding liner for an unvulcanized rubber material according to claim 1, wherein the protruding portions of each spacer include a plurality of protruding portions which are located in a winding start part of the winding liner, the plurality of protruding portions each having a top surface and a height defined by a distance between the top surface and the loading member, the height of some of the protruding portions being lower in height than the remainder of the protruding portions.

6. The winding liner for an unvulcanized rubber material according to claim 5, wherein the plurality of protruding portions which are located in the winding start part of the winding liner are gradually higher in height from the winding start side of the winding liner.

7. A winding liner for an unvulcanized rubber material, comprising:

a belt-shaped inextensible loading member for loading an unvulcanized rubber material; and spacers provided at both widthwise direction sides of one surface of the loading member along a lengthwise direction of the loading member, wherein the loading member and the spacers are made of metal and are formed into a plate shape having flexibility; and the spacers have protruding portions protruding from the one surface of the loading member, the protruding portions being disposed at predetermined intervals in the lengthwise direction of the loading member, wherein the protruding portions of each spacer include a plurality of protruding portions which are located in a winding start part of the winding liner, the plurality of protruding portions each having a top surface and a height defined by a distance between the top surface and the loading member, the height of some of the protruding portions being lower in height than the remainder of the protruding portions.

8. The winding liner for an unvulcanized rubber material according to claim 7, wherein the plurality of protruding portions which are located in the winding start part of the winding liner are gradually higher in height from the winding start side of the winding liner.

* * * * *